Jan. 29, 1929.
W. B. BURKE
1,700,431
MECHANISM FOR VULCANIZING TIRES
Filed July 22, 1925
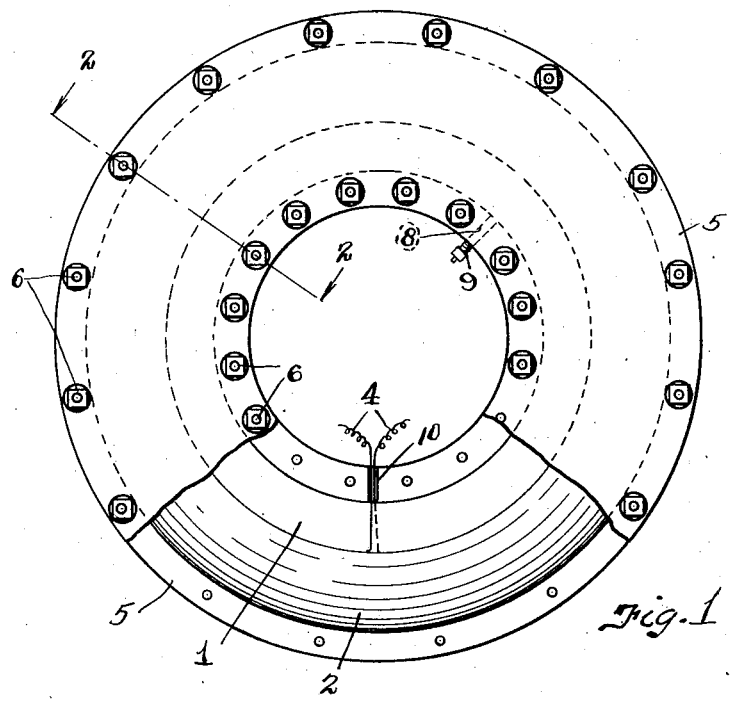
Fig. 1
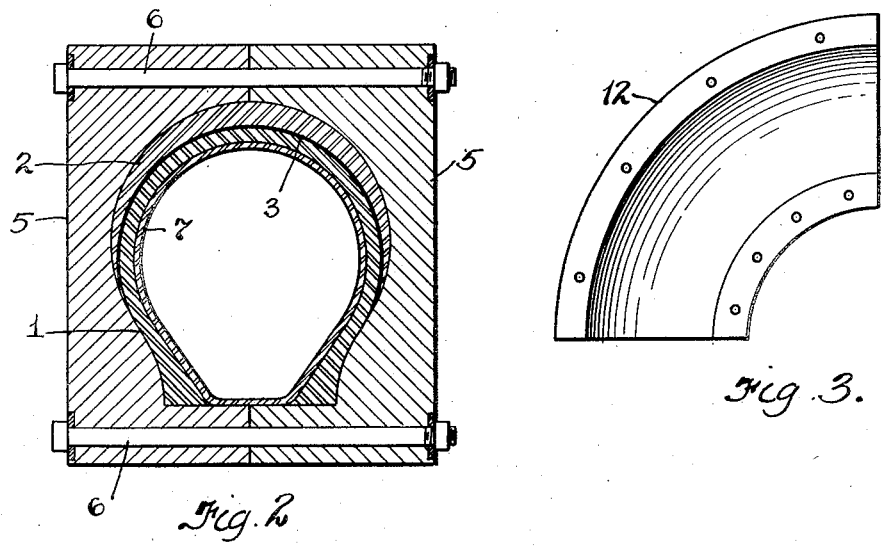
Fig. 2.
Fig. 3.
INVENTOR.
Wilbur B. Burke.
BY
Fay, Oberlin & Fay
ATTORNEYS.

Patented Jan. 29, 1929.

1,700,431

UNITED STATES PATENT OFFICE.

WILBUR B. BURKE, OF EAST CLEVELAND, OHIO, ASSIGNOR TO THE ELECTRIC VULCANIZING RUBBER COMPANY, OF CLEVELAND, OHIO, A CORPORATION OF OHIO.

MECHANISM FOR VULCANIZING TIRES.

Application filed July 22, 1925. Serial No. 45,233.

The present improvements relate more particularly to an apparatus or mechanism suitable for use in carrying out the improved method of vulcanizing tire treads to casings, or for vulcanizing together the components of other rubber articles, which forms the subject matter of United States Letters Patent No. 1,216,654, granted to me under date of February 20, 1917. The method in question, briefly stated, involves the interposition between the body or carcass of a tire casing and the tread which is to be vulcanized thereto, of a vulcanizing element consisting of a layer of fresh rubber that has an electric heating resistance in contact therewith. Upon placing the components in question under suitable pressure and then passing an electric current through such heating element the layer of fresh rubber may be vulcanized to exactly the proper degree and thereby bind the other parts of the completed tire together without heating the latter to an excessive degree, or, in other words, without over-vulcanizing the tire or other equivalent article.

In my aforesaid patent, as well as in my subsequently issued Patent, No. 1,339,736, dated May 11, 1920, for an improvement in the construction of the aforesaid vulcanizing element, and in method of making such element, the disclosed method for assembling the several parts together and securing the desired degree of pressure preparatory to passing the electric current through the resistance in such vulcanizing element, involves the mounting of the tire casing or carcass on a rim of the same sort and size as would be used in mounting a corresponding tire on a vehicle wheel, such rim having radially projecting incurved or outwardly inclined flanges, depending upon whether the tire is of the clincher or straight side type. An inner tube is included within the casing so that upon inflation of such tube the casing may be expanded and thus press the outer surface of the same against the interior surface of the vulcanizing element, which is held in place during operation in question by means of a tape or the like wrapped around the rim, casing and tread, with the result that upon inflation of the inner tube the casing and tread will be pressed together.

I have found, however, that by this method not only is the degree of pressure which can be secured limited by the fact that when the tire casing is once fully distended it cannot of course be further expanded, (that is without bursting), any more than when a tire is mounted upon a vehicle wheel rim; but also, due to radiation of heat through the tire parts, the wrapping tape affording practically no obstacle to such radiation, more electric current is consumed than should be necessary, and such radiation being necessarily an uncertain factor, it is difficult to secure a uniform degree of vulcanization entirely around the casing. Furthermore, the lower portions of the sides of the tread which is to be vulcanized to the tire casing are not held against the latter as tightly by such tape wrapping as the outer portion of the tread, so that it is not always possible to secure a satisfactory union of the lateral edges of the tread to the casing. Finally, the wrapping of tape around the parts in question is a more or less tedious matter and one that requires some skill if the proper degree of pressure is to be obtained when the tire is distended by inflation of the inner tube.

With the object, accordingly, of overcoming the several objections just enumerated I have devised the present improvements which include the mechanism as well as the method steps involved in the use of such mechanism hereinafter fully described and particularly pointed out in the claims, the annexed drawing and the following description setting forth in detail but one of various ways in which the principle of the invention may be used.

In said annexed drawing:—

Fig. 1 is a side elevation of one form of my improved mechanism, a portion of one of the mold parts being broken away in order more clearly to show the construction; Fig. 2 is a transverse section thereof on a somewhat larger scale, the plane of the section being indicated by the line 2—2, Fig. 1; and Fig. 3 is an inside elevation of a mold part slightly differing in construction from the mold parts shown in Figs. 1 and 2.

As indicated in both of Figs. 1 and 2 the tire casing or carcass 1, with the tread 2 and interposed vulcanizing element 3, are there shown properly arranged for the vulcanizing operation. The construction of such vulcanizing element may be assumed to be that of either of my aforesaid patents and so need not be described in detail. The current is designed to be conducted to such element through one or more paired leads 4, as shown in Fig. 1.

In my present improved mechanism, instead of mounting such casing on a rim I place it, after the other component parts just mentioned have been applied thereto, within a split mold that comprises two complementary parts 5, 5, the inner faces of which are recessed to conform with the exterior shape of the assembled tire casing when in normal distended condition. These mold parts, as shown, are adapted to be firmly secured together after the tire casing has been thus assembled therein by means of a plurality of bolts 6 that extend therethrough at suitably spaced intervals about the inner and outer peripheral edges of the mold. Instead, however, of such bolts any other suitable means may be employed in order firmly to clamp the mold parts together during the vulcanizing operation.

As hereinbefore indicated the so-called inner tube 7 is placed inside the casing so that upon inflation of such tube the parts of the tire casing, including the interposed vulcanizing element 3, may be forced outwardly against the confining walls of the mold with whatever degree of pressure is found desirable. At a suitable point the mold parts 5 are provided with matched radial recesses that form an opening 8, through which the valve stem 9 of such inner tube 7 projects for the purpose of inflating the latter. Similar radial recesses 10 are formed at one or more points in the mold parts to permit the leads 4 to project therethrough, as will be readily understood.

As shown in the drawing the mold parts are relatively thick-walled and they are furthermore composed of a material that is a poor conductor for heat, e. g., hard wood, which has been found in practice a very satisfactory material for the purpose. As a result, the loss of heat generated by the passage of the electric current through the resistance in the vulcanizing element is reduced to a minimum and the amount of current required for this purpose is very much less than in the machinism heretofore employed in this connection. As a matter of fact, the electric current may be discontinued before the vulcanizing has been completed inasmuch as the heat generated thereby is so completely retained within the mold that the vulcanizing will proceed to completion merely from the heat absorbed in the parts composing the casing. Furthermore, the distribution of the heat throughout the components being vulcanized, and thus through the vulcanizing element itself, will be much more even and uniform and the danger of local over-heating is substantially eleminated.

Where, instead of a complete tire tread, only a patch is to be vulcanized onto the tire casing or carcass, a segmental mold may be employed instead of one, as just described, that is adapted to include the entire casing. One such segmental mold part 12 is shown in Fig. 3, which equally will serve to illustrate the interior conformation of a corresponding section of one of the mold parts 5. The manner in which such segmental mold is employed will be substantially identical with that just described. It will not, however, be necessary in the case of such segmental mold to provide openings for the valve stem of the inner tube or for the leads 4, since these may be disposed so as to project beyond the one end or the other of said mold.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:—

1. In mechanism for vulcanizing together components of a rubber article by means of an interposed vulcanizing element including an electric heating resistance, the combination of complementary mold-parts conforming to the normal exterior shape of such article wherein the latter is confined under pressure, said mold-parts being composed of wood.

2. In mechanism for vulcanizing together the parts of a tire-casing by means of an interposed vulcanizing element including an electric heating resistance, the combination of complementary mold-parts conforming to the normal exterior shape of such casing, and means for expanding the latter from within, said mold-parts being composed of wood.

Signed by me this 20 day of July, 1925.

WILBUR B. BURKE.